United States Patent [19]

Hagen

[11] 3,850,044

[45] Nov. 26, 1974

[54] BICYCLE TRANSMISSION
[76] Inventor: Donald H. Hagen, 4213 61st Ave. No., Minneapolis, Minn. 55429
[22] Filed: May 10, 1973
[21] Appl. No.: 359,120

[52] U.S. Cl. ............................................. 74/230.23
[51] Int. Cl. ........................................... F16h 55/54
[58] Field of Search ...................... 74/230.18, 230.23

[56] References Cited
UNITED STATES PATENTS
724,450  4/1903  Dumaresq ........................ 74/230.23
FOREIGN PATENTS OR APPLICATIONS
625,124  6/1949  Great Britain .................... 74/230.18

Primary Examiner—Leonard H. Gerin
Attorney, Agent, or Firm—James R. Cwayna

[57] ABSTRACT

A transmission particularly designed for use with bicycles which includes an infinitely variable sprocket device for adjusting the various speeds at which the bicycle may be driven. The infinitely variable sprocket includes a first driving member attached to and for rotation with the pedals of the bicycle having a purality of chain engaging, driving elements thereon which elements are arranged for radial shifting such that the effective driving diameter of the drive sprocket may be increased or decreased. The radial shifting of these members is obtained through a control plate having a generally circular scroll path defined thereon in which the individual chain driving elements are guided such that when the drive plate and scroll plate are normally rotated together the driving elements will be maintained in one position and when the relative speeds of the scroll plate and the driving plate are changed the individual drive elements will be shifted radially inwardly or outwardly. In addition to this the individual drive elements are individual sprocket elements or sprocket segments which are arranged for one way rotation such that an idle position of the pedals may also be maintained.

8 Claims, 8 Drawing Figures

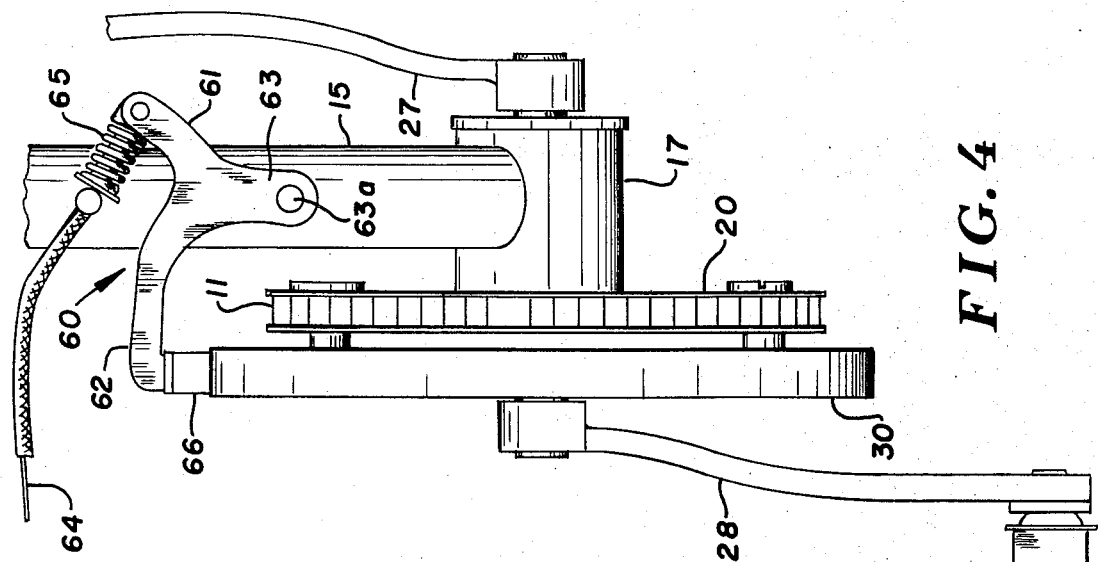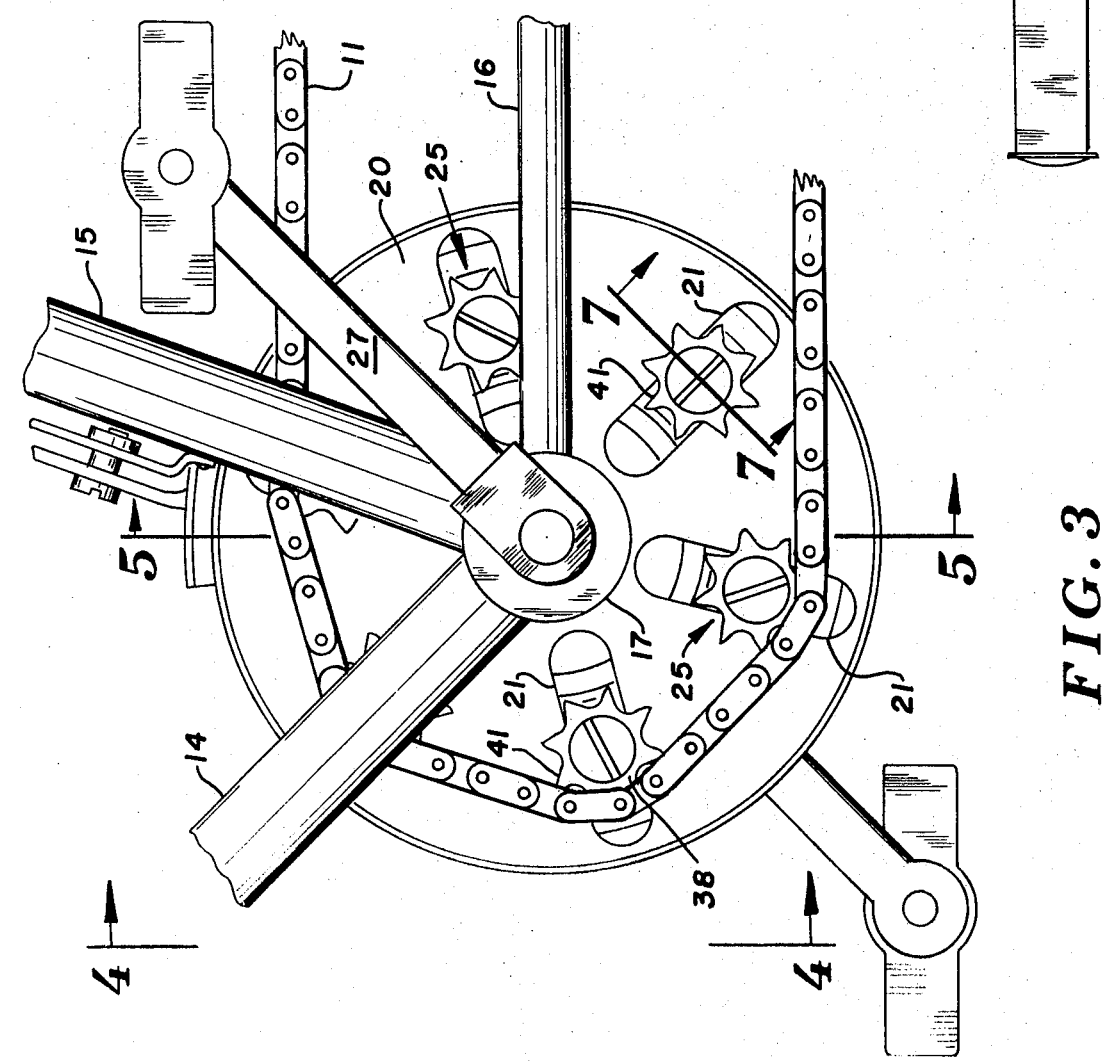

BICYCLE TRANSMISSION

In the past various bicycle transmissions have been provided which provide various speed selections for the operator thereof. The highly complex and multi-speed units such as 10 speed devices include what are known as deraileur systems which incorporate a plurality of sprocket members mounted for driving the rear wheel and a plurality of sprocket members rotatable with the pedals of the bicycle. Speed changes are obtained by shifting the chain between the various combinations afforded between the sprockets. This particular system will provide a stepped transmission concept but as is well known to those skilled in the bicycle art, the chain in such a unit is not always driven in a straight line and further the shifting from sprocket to sprocket of the chain requires that the unit be kept in very positive, fine tuned condition. This adjustment condition is very hard to maintain and these units are not highly reliable.

Applicant has provided herein a unique bicycle transmission which is not of the stepped gearing variety but rather permits a completely infinite range of gearing between the front drive sprocket and the rear wheel without requiring that the chain be shifted from one gear to another. This is accomplished by providing a means for altering and modifying the driving diameter of the pedal driven sprocket.

With applicant's concepts the cyclist is afforded an infinite variety of gearing which gearing may be obtained while continually applying power to the unit when the gear ratio is being increased and which will only require a cessation of power delivery when the gear ratio is being decreased.

It is therefore an object of applicant's invention to provide a unique bicycle transmission which affords and infinite variety of gearing selections which gearing selections may be made without steps in shifting from one gear to another.

It is a further object of applicant's invention to provide a bicycle transmission which provides the operator thereof complete flexibility in determining the gear ratios at which he wishes to pedal the bicycle by providing an infinitely variable front chain driving sprocket therefore.

It is a further object of applicant's invention to provide a bicycle transmission unit which may be easily adaptable and interchangeable with bicycles employing what is commonly known as a three crank construction.

These and other objects and advantages of applicant's invention will more fully appear from the following description made in connection with the accompanying drawings, wherein like reference characters refer to the same or similar parts throughout the several views, and in which:

FIG. 3 is a side elevation taken substantially opposite that of FIG. 2;

FIG. 4 is a vertical section taken substantially along Line 4—4 of FIG. 3;

Figures 1, 2:
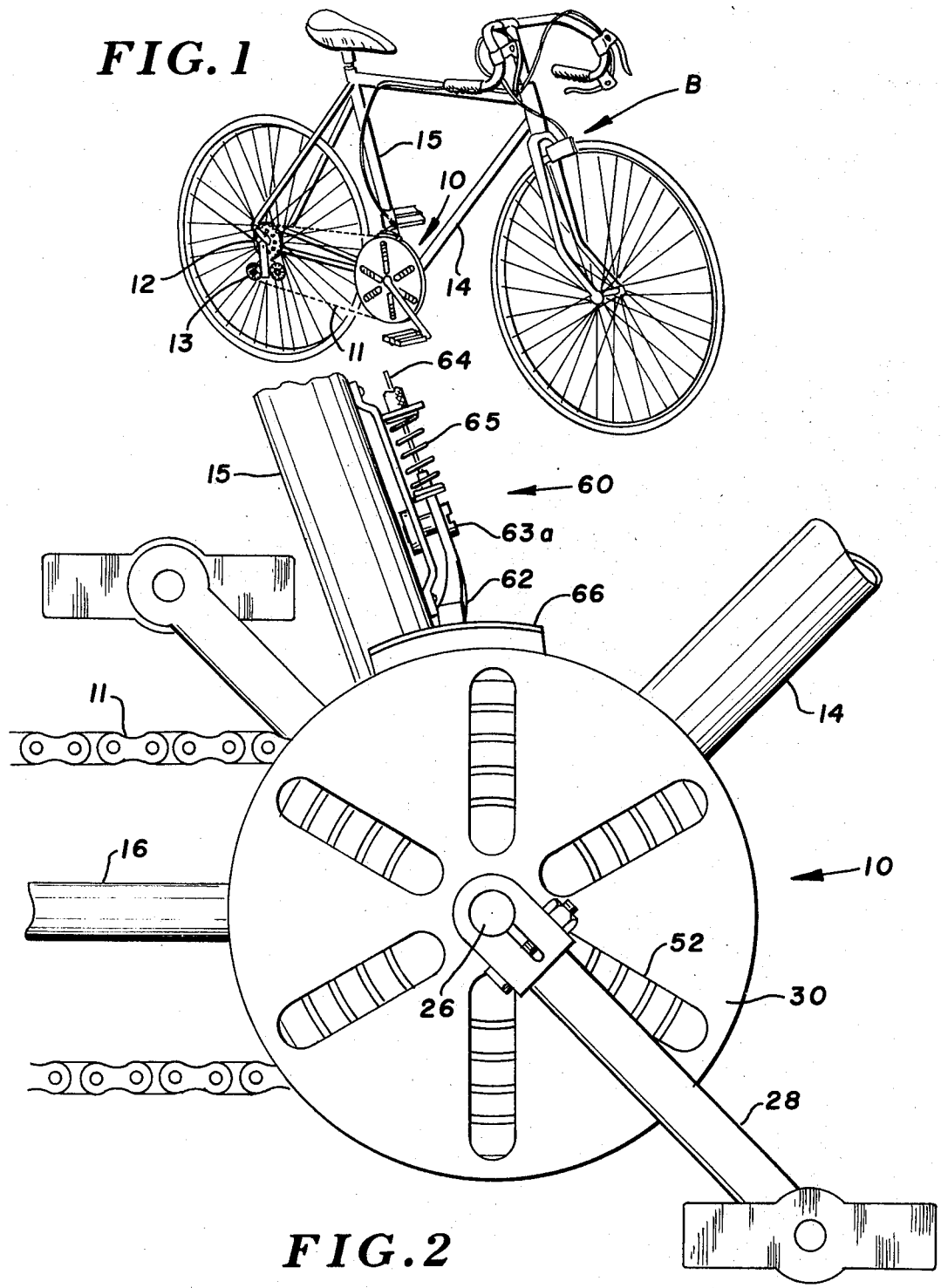
FIG. 1 is a perspective view of a bicycle embodying the concepts of applicant's invention.
FIG. 2 is a side elevation taken from one side of the transmission showing supporting portions of the frame.

In accordance with the accompanying drawings, applicant provides a transmission device 10 illustrated on a bicycle B arranged to normally drive the chain 11 of the bicycle and thereby the rear sprocket 12 and rear wheel thereof. With applicant's variable transmission device 10 it is necessary to maintain proper driving tension in the chain 11 and for this reason a chain tightener 13 is provided on the chain. Such chain tighteners are well known in the art with various multi-speed bicycle units and therefore a further detailed explanation of the same is not deemed necessary.

Obviously the bicycle unit B includes frame structures and those frame structures which are important to the concept and utilization of applicant's invention are designated respectively 14, 15, 16. Frame structure 14 may be termed a front frame element, 15 may be termed an upright element and 16 a rear wheel support element.

These frame elements terminate in or join at a pedal supporting boss member 17 which has a passage therethrough and is provided with a pair of bearings or the like 18, 19 for receiving the rod 26 of the pedal crank assembly therethrough.

Applicant's transmission unit 10 includes a first driving plate member 20, in the form shown, being generally circular in shape and having a purality of radially extending slots 21 spaced arcuately therearound. In the form shown, six of these slots 21 are provided and this first driving plate member 20 is formed as particularly illustrated in FIG. 7 by providing a pair of stamped circular elements 22, 23 which are provided with the radially extending slots 21 therein which slots 21 are formed by stamping the plates to provide a downwardly and outwardly extending shoulder portion 22a, 23a such that a driving portion of the individual sprocket element 25 may be received and captured therein for sliding movement within the slots 21. These two plate members 22, 23 are individually formed and the sprocket member designated at this point in its entirety 25 is inserted therein before assembly and after such insertion the plate members 22, 23 are spot welded together or joined through some other similar means. This construction will allow the sprocket members 25 to slide radially within the slots 21 while positively capturing the same therein. A passage 24 is provided through this first drive plate and this plate is rigidly secured to the rod member 26 joining the two pedals 27, 28 for rotation therewith.

In a three crank assembly for bicycles, a pin 26 is provided to pass through the bearing housing 17 and, in the form shown, this pin member 26 is secured therein, as for example with a first shoulder portion 26a, abutting with first bearing 18 and a threaded section 26b on the other end thereof which threadedly receives a capturing element 29 for closure against second bearing 19. This particular construction is immaterial to the concepts of the invention except to illustrate that applicant's device may be easily affixed to any three crank pedal constructions in that normally the pedal portions 27, 28 are removable from the pin portion 26 and it is only necessary to place the driving plate 20 and the control plate 30 thereon to entirely change existing units to applicant's concepts.

Figure 7:
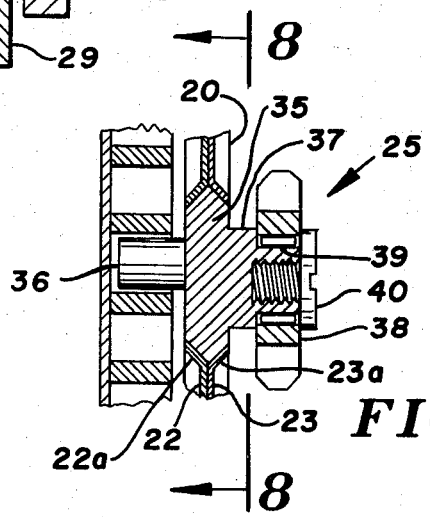
FIG. 7 is a section taken substantially along Line 7—7 of FIG. 3.
Figure 8:
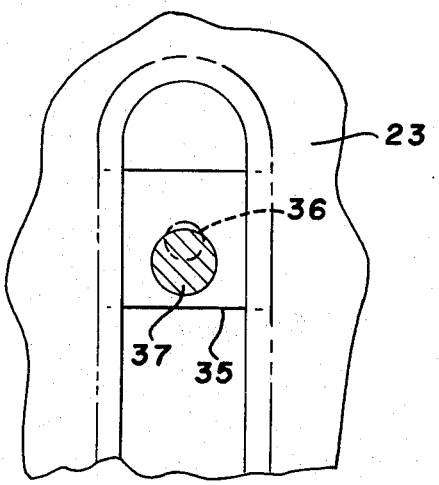
FIG. 8 is a section taken substantially along Line 8—8 of FIG. 7.

The individual sprocket elements which were previously designated 25 are arranged for sliding radial movement within the slots 21 by providing a tapered guiding block portion 35 receivable within the aforementioned guiding slot formed by the formed individual plate members 22, 23 of drive plate 20 and as illustrated in FIGS. 7 and 8 the confirmation of the guide block 35 to this slot 21 will permit only radial movement thereof.

As illustrated in FIG. 7 these individual driving elements 25 include a first guiding and positioning shaft portion 36 extending from one side of the guide block 35 to be received into a scroll and guiding plate that will be discussed hereinafter and a second sprocket mounting boss 37 extending ourwardly from the other side of the block 35. Arranged on the boss 37 is, in the form shown, a totally arcuate sprocket member 38 which is of the same pitch as the chain 11 used on the bicycle. These sprockets 25, although illustrated as being totally arcuate in shape, may take the form of arcuate segments rather than full circular elements without departing from the scope of the invention. One important aspect of the invention is the utilization of bearing members 39 which permit rotation in only one direction. These bearing members 39 are known in the art and are commonly known as roller clutches which permit indexing, back stopping and overrunning of the unit. In other words, the one way bearing 39 will permit the operator of the bicycle to stop pedaling or to pedal backwards while the chain continues its forward movement but when the bicyclist again begins pedaling forwardly, the one way rotation will continually provide a forward driving motion for the chain. If it were not for this aspect it would be impossible to have a neutral condition with this device or as will be discussed hereinafter it would be impossible to lower the gearing ratio as it is necessary to pedal backwards in this concept to lower the gear ratio.

As further illustrated in FIG. 7 a capturing element 40 is provided on the end of the shoulder 37 to positively retain the sprocket members 38 thereon.

As also illustrated in FIG. 3 the teeth of the sprocket members 38 are particularly shaped and beveled to provide a more efficient locating arrangement for the sprocket 38. As illustrated therein the teeth of the sprockets are provided with their normal involute shape to normally receive the roller bearings or roller sections of the chain 11 but the rear side of the tooth which is designated in these drawings as 41 is sharply tapered such that should the tip of a tooth impinge upon a particular roller of the chain 11 it will cause the sprocket 38 to be rotated when considering FIG. 3 in a counterclock wise direction, this being the direction of free rotation of the unit such that the tooth will properly engage between the roller sections.

As also illustrated in FIGS. 7 and 8 it should be noted that the center line of the shoulder 37 upon which the sprocket 38 is mounted is offset with respect to a center line of the rearwardly extending positioning shaft 36. This purpose will become obvious as applicant discusses the scroll plate positioning member 30 as this offset permits the locating of all of the sprocket members 38 at positions equal distance from the center of the connecting rod 26.

Figure 6:
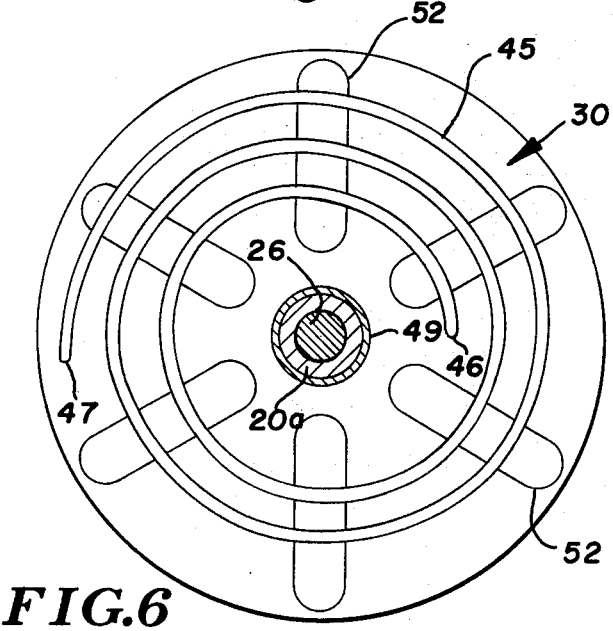
FIG. 6 is a vertical section taken substantially along Line 6—6 of FIG. 5.

In order to shift the sprocket members 25 radially outwardly, applicant provides a scroll plate assembly which is designated in its entirety 30. The face of this scroll plate is illustrated in FIG. 6 and provides a scroll path 45 generating from an interior point 46 and terminating at an exterior point 47. The circular scroll provides a smooth, ever increasing radial path and it is within this path that the guide elements 36 of the individual drive sprockets 25 is received. In the form shown, an internal bushing 49 is provided in the scroll plate 30 and this bushing is arranged about an extending shoulder 20a on the drive plate 20. By providing this plate 30 in such a position and this bushing 49 in such a position it should be obvious that the scroll plate 30 will normally rotate with the drive plate 20. This normal rotation is obviously due to the friction and positioning of the number of locating elements 36 arranged within the scroll path 45. It should further be obvious that this bearing mounting situation permits movement of the scroll plate 30 relative to the drive plate 20.

Figure 5:
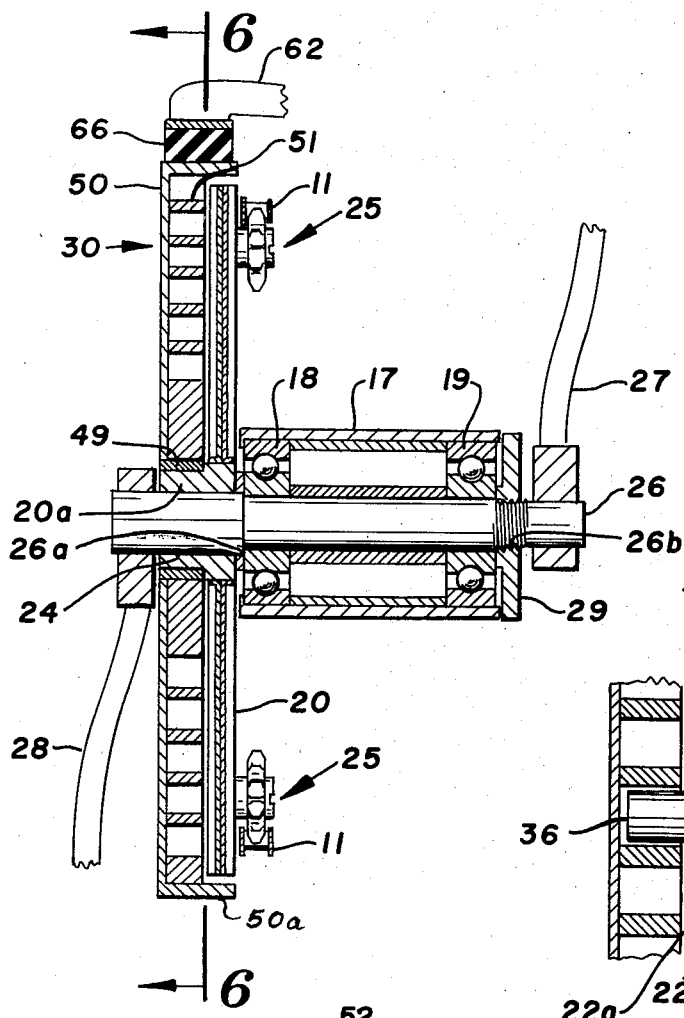
FIG. 5 is a vertical section taken substantially along Line 5—5 of FIG. 3.

The scroll plate 30, in the form shown, and as particularly illustrated in FIG. 5 includes a first mounting plate 50 generally arcuate in shape with a circular flange 50a and a second plate 51 through which the scroll path has been punched or otherwise machined after such operation the two plates 50 and 51 are then joined to form the entire plate 30. It should be noted that a plurality of radial slots 52 are provided in the solid plate 50 and these slots provide clean out grooves such that should relative rotation take place between the scroll plate 30 and the drive plate 20 the movement of the guiding and positioning pins 36 will brush past these openings therefore causing any dirt or the like that may have been trapped in the scroll groove 45 to be forced through the slots 52.

In order to provide radial shifting of sprockets it is necessary to provide relative rotation between plate 20 and plate 30 such that the sprocket members 25 will be shifted radially. Applicant obtains this situation by providing a simple brake mechanism generally designated 60 mounted upon frame element 15 to provide a brake to the scroll plate. Obviously when the scroll plate is stopped the continuing rotation of the drive plate 20 will cause the individual drive elements 25 to be moved along the circular scroll path and thereby be moved outwardly into an area of increased diameter and therefore increased gearing.

Applicant provides a simple braking structure by providing a yoke member having arms 61, 62, 63 with arm 61 being connected to a control cable 64 which extends upwardly to some type of control element which will permit tightening of the cable 64 with a return spring 65 to insure the release of the cable and thus reshift the brake element 60 to an open position wien the handle bar is released. Arm 63 is pivotly mounted on the frame element 15 through a capturing element 63 or the like and arm 62 is provided with a brake lining 66 or the like thereon to contact with the periphery of the scroll plate flange 50a for braking thereagainst. Obviously this brake member 66 should be generally arcuate in shape and provide a sufficient braking surface such that the scroll plate member 30 may be positively stopped.

With applicant's device the primary concept is to provide a positive means for moving the individual sprocket elements inwardly and outwardly simultaneously while maintaining the same at positions equal from the center of rotation of the crank unit. Although various other means could be provided to accomplish this, the utilization of the scroll plate and the relative rotation concept between the scroll plate and the drive plate does positively accomplish this requirement. It should be noted that another concept provided by applicants herein is the discovery that it is not necessary to run a chain in a circular configuration but rather that the chain may take the configuration as defined by the teeth of the individual sprocket elements and this particular situation is illustrated in FIG. 3. The chain is obviously free to bend and this is common with chains.

With applicant's device, in order to increase the gear ratio the peddler simply continues peddling in his normal forward or clockwise direction and when he applies the brake to the scroll plate the continuing rotation of the drive plate will drive the individual sprocket members outwardly radially within the slots 21 and this outward movement is obtained by causing the sprockets to move about the scroll path. Whenever the peddler releases the brake the plates will rotate together due to the friction between the sprocket guide shoulders 36 and the scroll surfaces and no further speed increase is obtained.

This situation then gives a finite radial adjustment to the sprockets.

When the cyclist requires a gear reduction, it is necessary for him to apply the brake to the scroll plate and peddle backwards thus driving the sprockets rearwardly along the scroll path. The one direction bearings permit this rearward pedalling.

It should be obvious that applicant has provided a unique, infinitely variable bicycle transmission which eliminates gearing step changes and which accomplishes the same through a simple means for controlling the radial or driving location for a sprocket unit.

What I claim is:

1. A transmission for a bicycle or similar chain driven vehicle which vehicle includes a pedal, crank arrangement, said transmission including:
   a. a first drive plate arranged for driving rotation with the pedal crank arrangement;
   b. a plurality of individual chain engaging elements arranged on said drive plate and being radially moveable thereon;
   c. means for adjustably positioning said chain engaging elements on said drive plate;
   d. said chain engaging elements including arcuate sprocket members mounted for rotation in one direction relation to said drive plate;
   e. said means for adjustably positioning said chain engaging elements including:
      1. a scroll plate member defining at least one path of ever increasing radius thereon, said scroll plate being mounted for free rotation and being positioned adjacent said drive plate;
      2. guide means extending from said chain engaging elements into said path;
      3. radially extending guides on said drive plate, said guide means arranged to move radially within said guides;
   f. means for providing relative rotation between said drive and said scroll plate whereby said chain engaging elemetns are driven by the guides to vary the radial positions thereof; and,
   g. said means for providing relative rotation between said drive and scroll plates including brake means shiftable into braking engagement with said scroll plate.

2. The structure as set forth in claim 1 and said radially extending guides including radially extending guide slots formed in said drive plate.

3. The structure set forth in claim 1 and hand lever means and control cable means connected to said brake means for actuation thereof.

4. The structure set forth in claim 1 and means for mounting said sprocket members including:
   a. a first mounting block arranged for sliding movement in said radial guide slots;
   b. said guide means extending from one side of said block and establishing a first axis; and,
   c. a sprocket mounting shoulder extending from the other side of said block establishing a second axis radially offset from said first axis.

5. The structure set forth in claim 4 and said offset being determined for each said sprocket in conjunction with the rate of radial increase of said guide path to maintain said sprockets in concentric relation.

6. The structure set forth in claim 1 and said scroll plate having a plurality of openings formed at least partially therethrough for cleaning of said scroll as said guide means are moved therepast.

7. The structure set forth in claim 6 and said scroll plate being formed from a first, generally flat plate and a second scroll defining plate and means for attaching the same together.

8. A drive mechanism for a bicycle or similar chain driven vehicle, which vehicle includes a drive sprocket and a driven sprocket for driving a rear wheel for the vehicle, said mechanism including:
   a. a first drive plate arranged for driving rotation with the rear wheel of the vehicle;
   b. a plurality of individual chain engaging elements arranged on said drive plate and being radially moveable thereon, said chain engaging elements including arcuate sprocket members mounted for rotation in one direction relative to said drive plate;
   c. means for adjustably positioning said chain engaging elements on said drive plate including;
      1. a scroll plate member defining at least one path of ever increasing radius thereon, said plate being mounted for free rotation and being positioned adjacent said drive plate;
      2. guide means extending from said chain engaging elements into said path;
      3. radially extending guides on said drive plate, said guide means arranged to extend into said guides; and,
      4. means for providing relative rotation between said drive and scroll plates including brake means shiftable into braking engagement with said scroll plate whereby said chain engaging elements are driven by the radially extending guides to vary their radial positions.

* * * * *